March 21, 1967 S. A. HARAM, JR 3,310,676
NEUTRON IRRADIATING APPARATUS HAVING A PLURALITY OF
AXIAL SHIELDED PASSAGES FOR INTERCHANGING
SOURCES AND TARGET MATERIALS
Filed Aug. 20, 1963
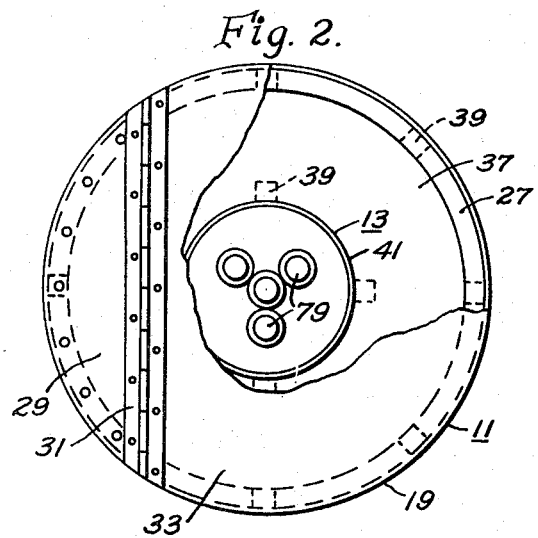
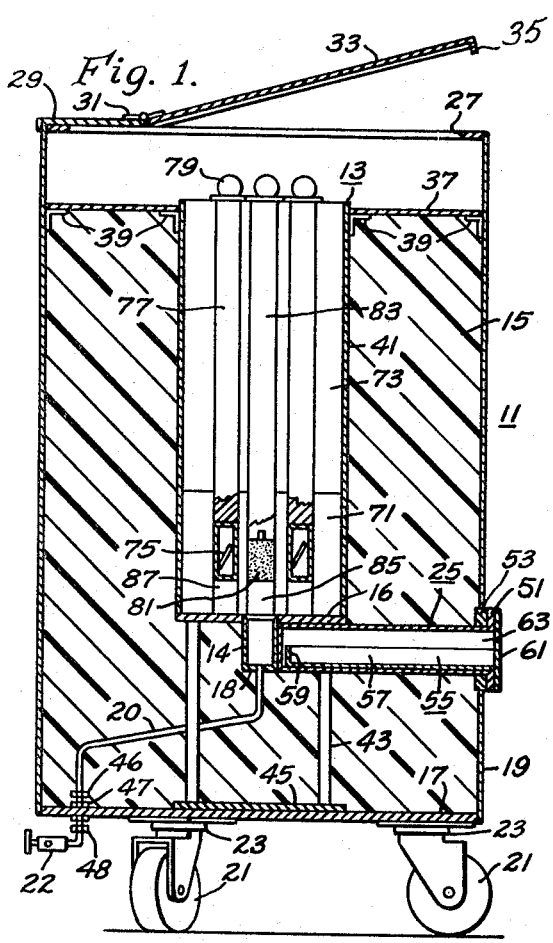
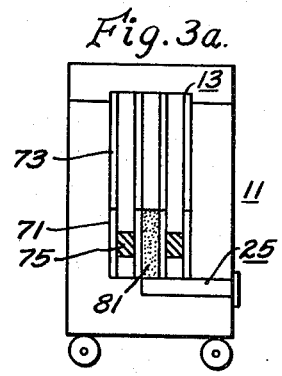
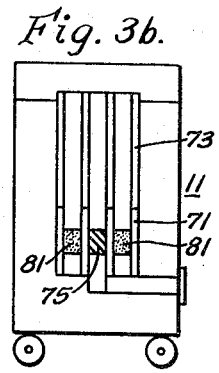
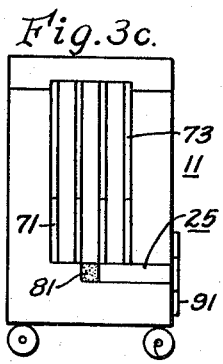
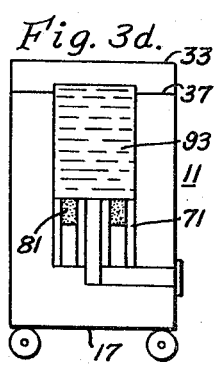
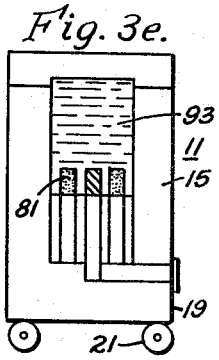
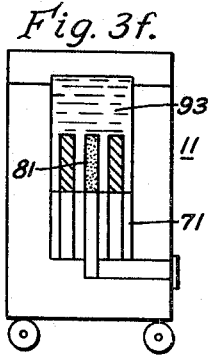
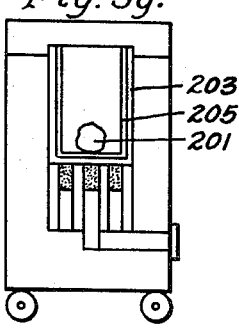

3,310,676
NEUTRON IRRADIATING APPARATUS HAVING A PLURALITY OF AXIAL SHIELDED PASSAGES FOR INTERCHANGING SOURCES AND TARGET MATERIALS
Servin A. Haram, Jr., Monroeville, Pa., assignor to Nuclear Material and Equipment Corporation, Apollo, Pa., a corporation of Pennsylvania
Filed Aug. 20, 1963, Ser. No. 303,241
1 Claim. (Cl. 250—108)

This invention relates to the nuclear art and has particular relationship to the irradiation of materials with neutrons. In its specific aspects this invention concerns itself with apparatus for demonstrating and investigating neutron phenomena and to apparatus for scientifically investigating the effects of neutrons on different materials and for deriving isotopes by neutron bombardment. Such apparatus is particularly useful for educational purposes.

Typically neutrons may be derived from a source composed of an alloy of plutonium and beryllium or mixtures of americium oxide and beryllium. The alloy may be $PuBe_{13}$ typically. The mixture may typically vary from 4 parts by weight beryllium and 1 part by weight of americium as oxide to 10 parts Be and 1 part Am as $AmO_2$. The neutron emitter may be a small cylinder of the alloy encased in a jacket of tantalum which, in turn, is encased in stainless steel. One or both bases of the stainless steel casing may be of magnetizable stainless teel or may have a trip of magnetizable steel. The source cylinder may then be readily removed from a well or tube in which it is inserted by a rod having a magnetic tip.

The source emits high speed neutrons which may be converted into thermal neutrons by transmission through polyethylene or water. If high-speed neutrons are desired, the thermal neutrons may be eliminated by a cadmium shield or jacket.

There are a number of materials which may be irradiated. These include hafnium, manganese, indium, gold, selenium, silver and vanadium. Foils of the metals and powders of the oxides are bombarded by neutrons. The neutron bombardment of foils or powders of these materials produces isotopes which is manifested by radioactivity and ionization and may be detected and measured by G-M counters and the like.

Apparatus in accordance with the teachings of the prior art typically includes a generally cylindrical tank or container of neutron moderating or absorbing material such as paraffin. The paraffin has an axial hole, from the inner end of which one or a plurality of radial ports extend. A neutron source is inserted in the hole usually opposite the inner end of the ports and materials in the ports are bombarded. After bombardment the radioactivity of the materials in different positions in the ports may be measured.

This prior-art apparatus has limited utility in the study of neutron phenomena. The facilities which it affords for the study of neutron reaction is limited to the relationships between bombarded material and source which can be set up with the ports and the axial hole.

It is then an object of this invention to overcome the above-described disadvantage of prior-art apparatus. Another object of this invention is to provide highly flexible apparatus availing a wide latitude in the investigation of neutron phenomena not only in the effects of neutrons on solids but also in their effects on liquids and in their biological effects. An incidental object of this invention is to provide apparatus which shall serve both to study or investigate neutron phenomena and also for the generation of appreciable quantities of isotopes.

In accordance with this invention apparatus for producing neutron phenomena is provided which includes a mass of neutron moderating and/or absorbing material, or a tank of such material. Whether it moderates or absorbs or both moderates and absorbs this material reduces the energy of the neutron flux. The mass or tank has a well in which there are one or more removable plugs of neutron moderating material. The plugs have coextensive holes in which neutron sources and/or material to be bombarded may be inserted. Preferably a central hole surrounded by peripheral holes are provided. The source or sources and material to be bombarded may be interchangeably mounted in the central and peripheral holes and the effects of neutrons diverging or converging towards the bombarded material may be observed. By mounting the sources in the peripheral holes and the material centrally neutrons may be concentrated on the material. The converging neutrons pass through the neutron moderating medium between the source and the material and this medium converts the high-energy neutrons emitted by the sources into thermal neutrons. The effects of concentration of thermal neutrons on material may then be observed. Such observation is not feasible with diverging neutrons since the maximum concentration of thermal neutrons is in such a case in a region whose distance from the source is small compared to the linear dimensions of the source. For example, with three 2 curie $PuBe_{13}$ sources in the central hole the measured thermal neutron flux in any peripheral hole is $3.4 \times 10^4$ n./sec./cm.$^2$ but with these three sources in three peripheral holes the measured thermal neutron flux in the central hole is $7.1 \times 10^4$ n./sec./cm.$^2$.

In the apparatus according to this invention, one or both plugs may be removed from the well and a container holding a liquid such as water or a solution may be inserted in the well. The liquid may be irradiated by neutrons from sources in or below the liquid and the effects of the radiation observed. Appreciable quantities of the liquid may be irradiated; in a typical situation there may be three liters of liquid in the well subject to irradiation with neutrons. In addition the plugs may be removed and biological specimens such as animals, plants or seeds irradiated in the resulting air space. If irradiation predominately by fast neutrons is desired a slow-neutron absorbing shield-liner may be placed in the well.

It has been found in the use of apparatus according to this invention to irradiate a saturated solution of potassium iodide with neutrons that appreciable quantities of iodine isotopes were produced.

For a clearer understanding of this invention, both as to its organization and as to its method of operation, together with additional objects and advantages thereof, reference is made to the following description of a specific embodiment taken in connection with the accompanying drawings, in which:

FIGURE 1 is a view in longitudinal section of this embodiment;

FIG. 2 is a view in top elevation of this embodiment with a part broken away; and FIGS. 3, a, b, c, d, e, f and g are generally diagrammatic views illustrating the flexibility of this invention as a facility for investigating neutron phenomena.

The apparatus shown in the drawing includes a generally cylindrical container 11 typically of a metal such as aluminum or stainless steel having a central generally cylindrical well 13. A cylindrical tube 14 extends centrally from the base 16 of the well in an axial direction. The well 13 and tube 14 are embedded in a mass of neutron-absorbing and/or moderating material 15, such as paraffin. The tube 14 has an opening in its base 18 to which a drainage coil 20 is connected. The drainage coil passes through the mass 15 and the base 17 and terminates in a valve 22.

The container 11 includes the circular base 17 to which a cylindrical wall 19 is internally welded. Casters 21 extend pivotally from caster bearings 23 secured to the base 17 and facilitate the movement of the container 11 from place to place. Just below the well the wall 19 has a plurality of openings (one shown) which are preferably uniformly spaced around the periphery of the wall 19 and through each of which a radial side port 25 extends. Each side-port 25 is embedded in the mass 15 and abuts the tube 14 at the inner end of the side port.

At the top an annular lip 27 is internally welded to the wall 19. A sector shaped plate 29 is bolted along a portion of the periphery of the lip 27 and carries a hinge 31 from which a cover 33 extends pivotally. The cover 33 has a lip 35 which overlaps tightly the upper rim of the wall 19.

The container 11 also has an inner annular cover 37 which covers the upper surface of the mass 15. This cover is bolted to angle brackets 39 welded to the inner surface of the wall 19 and to the outer surface of the wall 41 of the well 13.

The well 13 is also composed of a metal such as aluminum or stainless steel. This well is a generally cup-shaped container having base 16 to which wall 41 is internally welded. The base 16 has an internal opening into which the tube 14 extends. The tube 14 is externally welded to the base 16. The cup-shaped cylinder 16–41 is mounted on legs 43 which extend from a supporting base 45 disposed centrally on the base 17 of the container 11.

Before the tube 14 is inserted into the base 16 and welded to it, the coil 20 is inserted in the base 18 of the tube 14 and internally welded. The end 47 of the coil 20 is threaded. This end is passed through a hole in the base 17 and is locked by a bulkhead fitting 46 (for example Swagelok). The valve 22 is screwed on the external end of the coil 20 and also locked by a bulkhead fitting 48.

Each port 25 is a generally cup-shaped elongated tube of a metal such as aluminum having a flange 51 at its outer end. The flange 51 is bolted to a plug 53 typically of stainless steel (preferably AISI 304). Each port has a drawer 55. This drawer includes a sector 57, typically approximately one-half (180°), of a cylinder having a base 59 at the inner end and secured by welding to a disc 61 at the outer end. A disc 63 of a material such as Plexiglas abuts the disc 61 internally and is cemented, for example by epoxy resin to the joint of the disc 61 and sector 57. When the apparatus is in use, the foil (not shown) which is bombarded is held between additional discs of Plexiglas (not shown) similar to the disc 63 which are removably inserted in the drawer 55. The disc 61 may be bolted to the flange 51 when the apparatus is to be used. The drawer 55 may be removed and measuring equipment inserted in the cylinder 57.

In assembling the apparatus the inner cover 37 and the outer cover 33 and sector 29 are removed. The well 13 and coil 20 are placed on the base 17 of the container 11 with the threaded end 47 of the coil 20 extending through the opening in the base 17. The bulkhead fittings 46 and 48 are secured and the valve 22 is screwed onto the end of the coil 20. The side ports 25 are then inserted in the openings in the wall 19 and secured to the plugs 53. Liquefied paraffin is then poured into the container to form the mass 15 and the covers 37, and 29 and 33 are secured.

A plurality of plugs 71 and 73 are removably disposed in the well 13. Two plugs are shown but there may be more than two. The plugs are composed of a neutron moderating material, typically polyethylene, polystyrene or Plexiglas. The plugs 71 and 73 have coextensive openings including a central opening which is coextensive with the opening in tube 14 and peripheral openings.

With the plugs 71 and 73 in place, neutron sources and material to be irradiated may be interchangeably mounted in the openings. The material to be irradiated is placed in a cup 75 of a material such as polyethylene, polystyrene or Plexiglas, threaded internally at its upper rim, suspended from a rod 77 of the same material having a threaded tip and a knob 79. The cup 75 may be unscrewed from the rod 77, the material inserted and the cup replaced. The cup 75 may also be composed of a low neutron-absorbing cross section material such as zirconium, stainless steel or aluminum. The source or sources 81 may be mounted in the openings and removed from the openings by a rod 83 of a material, such as polyethylene, polystyrene or Plexiglas, which carries a magnetic screw (not shown) countersunk in its end that engages the magnetizable strip of the base of the source.

In FIG. 1 the source 81 is shown mounted centrally on a small plug 85 of neutron moderating material which extends into the tube 14 and the material cups are shown mounted peripherally on plugs 87 in the plug 71. Sources 81 and cups 75 may be interchanged or a plurality of sources 81 may be stacked in any of the openings. The sources 81 and cups 75 may also be removed from the openings, the plugs 71 and 73 removed and sources inserted in the tube 14 for use with the side ports 25. In this case the plugs 71 and 73 are replaced and the coextensive openings are plugged with neutron moderating rods.

In addition, one or both of the plugs 71 and 73 may be removed and liquids or substantial quantities of other materials irradiated. Usually only plug 73 is removed and the liquid is poured above the plug 71 directly or in a tank placed on plug 71. With the liquid in plug 71 neutron-sources may be disposed in the openings in plug 71 in direct contact with the liquid.

FIGS. 3a through g, illustrate a few of the investigations which are feasible with the apparatus according to this invention. As shown in FIGS. 3a and 3b, with the plugs 71 and 73 in place, peripheral material specimens in cups 75 may be irradiated with neutrons from a central source 81 or a central specimen may be irradiated by peripheral sources 81. In the FIG. 3a arrangement, three different specimens may be irradiated simultaneously. As shown in FIG. 3c, specimens in the ports 25 may be irradiated, or by inserting instruments in ports 25 the intensity of sources may be measured. A cadmium shield 91 may be provided where it is desirable to absorb thermal neutrons and operate only with high-energy neutrons.

In FIGS. 3, d, e, f, the upper plug 73 is replaced by a tank of liquids 93. The liquid 93 may be irradiated by peripheral sources 81 below, and out of, the liquid 93 (FIG. 3d) or in the liquid (FIG. 3e) or by a central source 81 in the liquid or out of the liquid. Large quantities of liquid may thus be treated and observed.

In FIG. 3g the apparatus adapted for biological studies with high speed neutrons is shown. In this case the specimens 201 are placed in a tank 203 plated with cadmium 205 to suppress low-speed neutrons.

While a preferred embodiment of this invention has been disclosed herein, many modifications thereof are feasible. This invention then is not to be limited except insofar as is necessitated by the spirit of the prior art.

I claim as my invention:

Apparatus for the study and investigation of neutron phenomena including a generally cylindrical shell of material for reducing the energy of neutron flux, a generally cylindrical core of neutron-moderating material removably disposed in said shell, said core having a plurality of axial passages, said passages being separated from each other by said neutron-moderating material, and means for removably disposing in said passages neutron sources and material to be acted upon by the neutrons from said source, the said spaces in which the said sources and the said last-named material respectively are inserted being selectably interchangeable, and the thickness of said shell being such as to absorb substantially the neutrons from said sources to preclude injury to personnel using said apparatus.

References Cited by the Examiner

UNITED STATES PATENTS

| | | | |
|---|---|---|---|
| 2,874,108 | 2/1959 | Ohlinger et al. | 250—108 X |
| 2,936,274 | 5/1960 | Dessauer | 250—84.5 X |
| 2,992,174 | 7/1961 | Edlund et al. | 176—50 X |
| 3,132,251 | 5/1964 | Maud et al. | 250—106 |
| 3,153,725 | 10/1964 | Attix | 250—44 X |

RALPH G. NILSON, *Primary Examiner.*

WALTER STOLWEIN, *Examiner.*

S. ELBAUM, *Assistant Examiner.*